Figure 1:
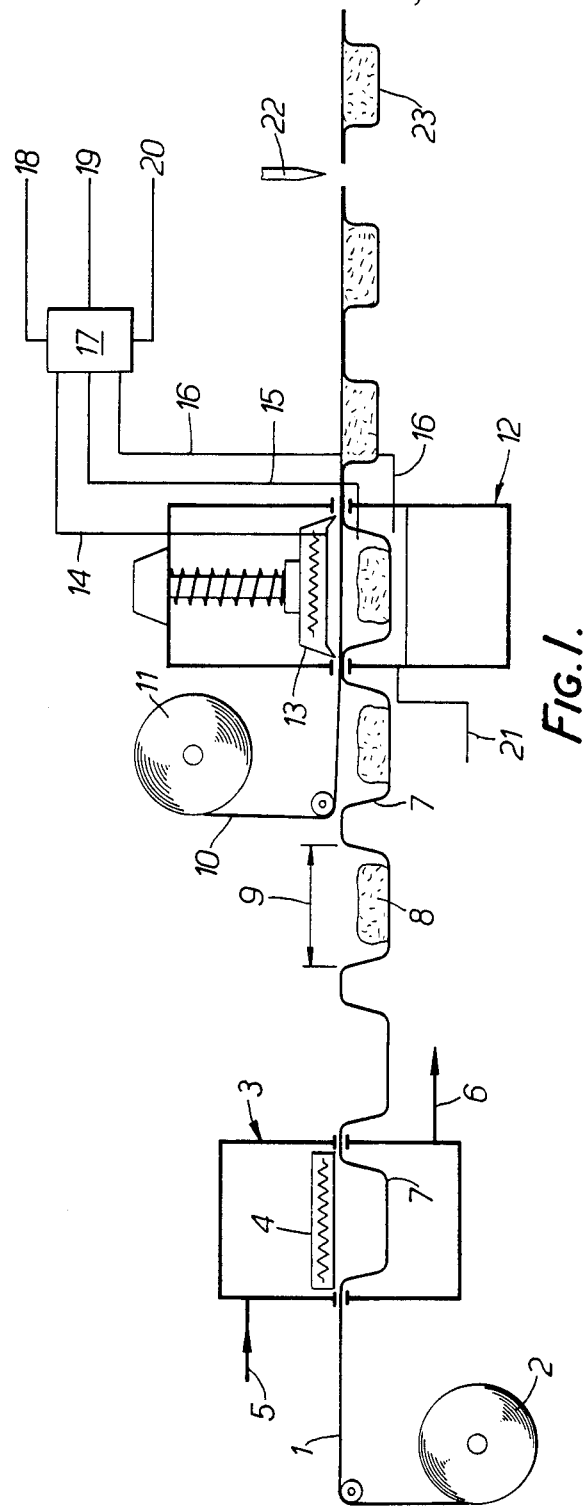

United States Patent [19]

Ferrar et al.

[11] Patent Number: 4,642,239
[45] Date of Patent: Feb. 10, 1987

[54] PACKAGING OF FRESH MEAT

[75] Inventors: Andrew N. Ferrar, Bolton; Arthur N. Jones, Beaconsfield, both of England

[73] Assignee: Transparent Paper PLC, Lancashire, England

[21] Appl. No.: 721,776

[22] Filed: Apr. 10, 1985

Related U.S. Application Data

[63] Continuation-in-part of Ser. No. 569,477, Jan. 9, 1984, abandoned.

[51] Int. Cl.⁴ .................... B65D 81/20; B65B 31/00
[52] U.S. Cl. .................... 426/396; 426/129; 426/264; 426/316; 426/415; 426/418; 426/412; 426/410; 426/127; 53/433; 53/442
[58] Field of Search .............. 426/129, 418, 415, 264, 426/316, 410, 396, 404, 412; 53/432-434

[56] References Cited

U.S. PATENT DOCUMENTS

| | | | |
|---|---|---|---|
| 2,623,826 | 10/1952 | Grinstead | 426/129 |
| 2,676,943 | 4/1954 | Carson | 426/129 |
| 2,711,373 | 6/1955 | Coleman et al. | 426/264 |
| 2,930,704 | 3/1960 | Williams | 426/316 |
| 2,947,638 | 8/1960 | Snyder et al. | 426/264 |
| 3,003,884 | 10/1961 | Andrews | 426/129 |
| 3,010,262 | 11/1961 | Rumsey | 426/129 |
| 3,029,149 | 4/1962 | De Long | 426/129 |
| 3,047,404 | 7/1962 | Vaughan | 426/129 |
| 3,343,331 | 9/1967 | French | 426/410 |
| 3,393,077 | 7/1968 | Moreau | 426/410 |
| 3,574,642 | 4/1971 | Weinke | 426/129 |
| 3,650,775 | 3/1972 | Simon et al. | 426/129 |
| 3,792,181 | 2/1974 | Mahaffy et al. | 426/129 |
| 3,851,080 | 11/1974 | Lugg | 426/418 |
| 3,922,358 | 11/1975 | Follett | 426/418 |
| 3,930,040 | 12/1975 | Woodruff | 426/418 |
| 3,987,209 | 10/1976 | Gatineau et al. | 426/513 |
| 4,055,672 | 10/1977 | Hirsch et al. | 426/129 |
| 4,294,859 | 10/1981 | Lundquist et al. | 426/418 |
| 4,548,824 | 10/1985 | Mitchell et al. | 426/129 |

FOREIGN PATENT DOCUMENTS 11697 of 1898 United Kingdom ................ 426/418

OTHER PUBLICATIONS

Modern Packaging Encyclopedia 1971, pp. 126, 129, 130, 144, 145, 148, 150, 7/71, vol. 44, #7A, McGraw Hill.
Modern Plastics Encyclopedia 1971, pp. 84, 89, 38, 41, 10/71, vol. 48, #10A, McGraw Hill.
Food Packaging, 1970, pp. 41, 44, Sacharow, Avi Publ.
Food Technology, 4/55, pp. 194–196.

Primary Examiner—Steven Weinstein
Attorney, Agent, or Firm—Fidelman, Wolffe & Waldron

[57] ABSTRACT

A method of packaging fresh meat is disclosed in which a first web of material is formed into a receptacle to receive the fresh meat and the receptacle is sealed with a second web of material. The meat is subjected to a vacuum treatment in the receptacle and sealing is effected at reduced pressure. In the vacuum treatment the oxygen partial pressure in the vicinity of the meat is first reduced below about 0.9 mm. of mercury to degas the meat and controlled partial release of the vacuum to an oxygen partial pressure of above about 11 mm. of mercury, preferably about 600 mm. of mercury is effected, the sealing being conducted at this pressure. By this means it is ensured that the meat is not stored or likely to remain under an oxygen partial pressure which is highly deleterious to the meat, particularly to its color and customer appeal. At least one of the webs of material is made of a material permeable to oxygen which can flow into the package, and at least one of the webs of material is transparent so that the contents can be viewed. One of the webs may be both transparent and permeable to oxygen. Ionomeric polymers and polymethyl pentene are disclosed as preferred oxygen-permeable materials which are also transparent.

13 Claims, 2 Drawing Figures

U.S. Patent  Feb. 10, 1987  4,642,239

PACKAGING OF FRESH MEAT

BACKGROUND OF THE INVENTION

This invention relates to a package of fresh meat and a method of packaging fresh meat and this application is a continuation-in-part application of our application Ser. No. 569,477 filed 1-9-84, now abandoned.

The term "fresh meat" as used in this specification includes frozen fresh meat, meat offals and meat products all uncooked.

Most retail packs of fresh meat which has been cut and packed for retail self service display have a critically short shelf life imposed by the loss of red oxymyoglobin colour. This turns brown by autoxidation, the ion on the Haem ring being oxidised from the ferrous to the ferric state. The rate of this autoxidation is governed by several factors including:
1. the partial pressure of oxygen at the surface of the meat;
2. the ambient temperature;
3. the pH of the meat;
4. microbial activity.

Factors 1 and 2 can be controlled by the choice of packaging system and subsequent handling procedures.

Work has already been done to prolong the shelf life of meat by packing it in highly impermeable barrier materials enclosing a controlled atmosphere. Typically this atmosphere is rich in both oxygen and carbon dioxide (75% $O_2$, 25% $CO_2$), the high level of oxygen encouraging deeper formation of the oxymyoglobin into the substance of the meat (see e.g. U.S. Pat. Nos. 3,851,080 to Lugg et al; 3,930,040 to Woodruff). This approach has many problems including high cost, extensive in-pack atmosphere, bulk, unnatural appearance of the product, difficulty in detecting leaking packs and reported 'explosive' spoilage by microbiological means when the consumer removes the pack from the point of sale. Vacuum packaging has also been proposed in the art (see e.g. U.S. Pat. Nos. 2,623,826 to Grinstead and 4,294,859 to Lundquist et al).

An alternative approach is described in U.S. Pat. No. 3,047,404 to Vaughan. In order to preserve the red colour of meat, Vaughan packages meat in oxygen-perrmeable film and stores the individual packages of meat in an atmosphere of high oxygen content where they are kept until they are put on display. This approach has the disadvantage that special containers for the packages are required, the containers serving to maintain the atmosphere of high oxygen content in the vicinity of the packages. However, if the high oxygen atmosphere should leak out of the container, there is the risk that due to the autoxidation of the meat the oxygen content in the container will fall to an unacceptably low level and will not be replaced as the atmosphere in the container will become enriched in carbon dioxide resulting from the autoxidation reaction.

U.S. Pat. No. 4,055,672 to Hirsch et al describes a method for the controlled atmospheric packaging of meat. The package of Hirsch et al comprises two package walls one of which is formed of gas impermeable material and the other of which is formed of a composite of an inner gas permeable layer and an outer gas impermeable layer. The outer layer is adapted to be removed from the inner layer without destroying the seal between the two package walls. The meat may be packaged under vacuum or in an inert atmosphere and when the outer layer is removed oxygen will flow through the inner layer and cause the meat to "bloom". As the rate of transmission of oxygen through the inner layer may be less than the rate of which the oxygen reacts with the meat initially, there is the possibility that the partial pressure of oxygen in contact with the meat will fall to an unacceptably low value where an undesirable brown colouration is formed in the meat. Furthermore, it is inconvenient to have to remove outer layers from a plurality of packages at the point of sale.

Finally, the art has described numerous ways of making packages and materials which may be used to make them including oxygen-permeable materials for use in packaging meat.

It is an object of the present invention to provide a method of packaging fresh meat which is simple to carry out and which produces a package which does not need to be stored in a special atmosphere and which is not a two-part package requiring excessive manipulation.

SUMMARY OF THE INVENTION

According to one aspect of the present invention there is provided a method of packaging fresh meat, comprising the steps of forming a first web of material into a receptacle to receive fresh meat, placing the fresh meat in said receptacle, subjecting said meat to a vacuum treatment to reduce the oxygen partial pressure in the vicinity of said meat to below 0.9 mm of mercury, effecting controlled partial release of said vacuum to an oxygen partial pressure in excess of about 11 mm of mercury, contacting the mouth of the receptacle with a second web of material, sealing said second web to said first web under the latter pressure to form a closed package containing said fresh meat and heating the resulting package to shrink one of said webs into close contact with said fresh meat; at least one of said webs being transparent and at least one of said webs being heat-shrinkable and having a permeability to oxygen of at least 3000 ml/m$^2$/24 hours/atmosphere differential for a thickness of 25 microns at N.T.P., and a permeability to carbon dioxide substantially greater than its permeability to oxygen. In the resulting package at least one of said webs of material is permeable to oxygen to an extent sufficient to allow oxygen to flow into the package, under the influence of partial pressure. The oxygen which flows into the package, under the influence of partial pressure, is to some extent transformed into carbon dioxide by the meat. The carbon dioxide has a higher diffusion rate than oxygen (approximately five times) and is also soluble in the meat system. This helps to maintain the "vacuum package" skin tight appearance as the carbon dioxide leaves the pack faster than the oxygen enters.

The effect of the vacuumising cycle is to remove the permanent gases from the meat. These may then be replaced with oxygen by controlled partial release of the vacuum with this gas in the processing cycle on the machine, which drives the oxygenation layer deeper into the meat and ensures that the condition of "Critical Oxygen Tension" (ref. Brooks et al Proc. Roy Soc. B 1937) does not develop during the labile phase before the meat passes into refrigerated storage and whilst handled in the warm phases of shrink and sealing. A secondary feature of this relief of vacuum is a reduction of the atmospheric pressure on the meat and minimising of pressure effects (absence of drip exudation).

The colour of meat is caused by the presence of certain respiratory pigments called the myoglobins. If a freshly cut meat surface is exposed to the air the myoglobin in the meat takes up oxygen by oxygenation to form oxymyoglobin which is bright scarlet red. However, the myoglobin also undergoes an oxidation reaction whereby the iron in the myoglobin which is in a ferrous state is oxidised into the ferric state whereby there is formed metamyoglobin which has a brown colour which is undesirable from a customer appeal point of view. This oxidation reaction takes place most rapidly at low oxygen concentrations (such as exist in deep muscle tissue) and the rate of reaction reaches a peak at an oxygen partial pressure of between approximately 0.9 and 11.0 mm.Hg., the peak value depending upon the temperature and the rate of reaction being substantially independent of the oxygen partial pressure above 11 mm.Hg.

In packaging fresh meat, it is therefore highly desirable to ensure that the meat is not stored in an atmosphere where the oxygen partial pressure is or is likely to fall within the range of 0.9 to 11.0 mm.Hg., during storage. In order to achieve this object, the meat is first submitted to a vacuum treatment in the present method so as to remove the permanent gases from the meat, including oxygen, so that the oxygen partial pressure in the vicinity of the meat is below 0.9 mm. og Hg. The vacuum is then partially released by the addition of oxygen to a value such that the oxygen partial pressure in the vicinity of the meat is above 11.0 mm. of Hg., and is preferably in the region of 600 mm. of Hg. In carrying out this treatment the meat is taken through the critical oxygen partial pressure range of 0.9 to 11.0 mm.Hg., but since this is done quickly there is no substantial detriment to the meat. In any case, care is taken to ensure that at no time during packaging or storage does the meat remain for any length of time in the critical oxygen partial pressure range. This is in contrast to some of the prior art packages, where it can happen that rate of permeation of oxygen through the package may be less than the initial uptake of oxygen by the meat so that the oxygen partial pressure in the package can fall within the critical range for a certain period.

In an alternative way of carrying out the present method, the controlled partial release of the vacuum may be effected with nitrogen or other inert gas instead of oxygen so that the fresh meat is packaged as a vacuum-packed anaerobic package which can be stored under vacuum or in an inert gas atmosphere in a "master pack" until required. After opening the "master pack", the exposure of the individual packages to air results in ready "blooming" i.e. reoxygenation of the respiratory pigment of the meat.

Accordingly, the present invention also provides a method of packaging fresh meat, comprising the steps of forming a first web of material into a receptacle to receive fresh meat, placing the fresh meat in said receptacle, subjecting said meat to a vacuum treatment to reduce the oxygen partial pressure in the vicinity of said meat to below 0.9 mm. of mercury, maintaining in the vicinity of said meat an atmosphere which is substantially oxygen-free and the pressure of which is subatmospheric, contacting the mouth of the receptacle with a second web of material, sealing said second web to said first under the latter pressure to form a closed package containing said fresh meat, heating the resulting package to shrink one of said webs into close contact with said fresh meat and passing said package into a substantially oxygen-free atmosphere for storage; at least one of said webs being transparent and at least one of said webs being heat-shrinkable and having a permeability ot oxygen of at least 3000 ml/m$^2$/24 hours/atmosphere differential for a thickness of 25 microns at N.T.P., and a permeability to carbon dioxide substantially greater than its permeability to oxygen.

In this alternative embodiment, the meat is stored in the anaerobic package at an oxygen partial pressure of below 0.9 mm.Hg., to minimise the oxidation of the myoglobin to metamyoglobin. The individual packages are also stored under vacuum or under an inert gas atmosphere, again at an oxygen partial pressure of below 0.9 mm.Hg. When the master pack is opened to expose the individual packages to air, or when the packages are removed individually from the master pack without disturbing the others, oxygen will permeate through the package to effect the oxygenation of the myoglobin. Initially the oxygen partial pressure in the vicinity of the meat will lie in the aforesaid critical region but the effect of this can be minimized by reducing the temperature of the packages when they first contact the air and by ensuring that the package has a high oxygen permeability.

Preferably one of the webs or layers is both transparent and permeable to oxygen, so that the package consists of one transparent film of oxygen-permeable polymer shrunk around the fresh meat which is supported on a more rigid and possibly contrasting polymeric layer to give a base.

The high level of oxygen permeability for the package material is dependent upon the choice of polymer and the formation of a thin film of the polymer on a vacuum packaging machine itself by a process of either hot or cold drawing to form the receptacle. This process of cold or hot drawing not only thins down the material, allowing high oxygen permeability but also builds in shrink energy so that a tight pack can be maintained by subsequent heat treatment either during heat-sealing of thermoformed web to non-thermoformed web or later by immersion of the whole pack or part thereof, in hot water (e.g., 70° C.–100° C., optimum 75° C.–80° C.), or in water vapour at an elevated temperature in a sealing chamber or by passing the pack through a heat tunnel.

The use of a hemispherical mould for the formation of the receptacle is particularly useful in that it permits uniform biaxial orientation of a polymeric film to take place allowing a uniform thickness to be generated and hence uniform oxygen permeability and subsequent shrinkage to be obtained. In practice, small deviations from hemispherical at the periphery of the mould are necessary to ensure the absence of stress localisation when the moulded film is sealed to the other web.

Ionomeric polymers are particularly suitable for use as oxygen-permeable materials for forming the present packages. These polymers are sodium or zinc salts of ethylene-acrylic acid or ethylene methacrylic acid copolymers. They have excellent transparency and the ability to seal through contamination, whilst possessing high oxygen permeability in thin sections. A single web of ionomer having a thickness of 25 to 250 micron can be used as the web from which the receptacles are formed while the other web from which the receptacles are formed is a composite lidding material composed of an ionomer web reinforced with a stiffer membrane to give the required rigidity. Permeable composites include board/ionomer, oriented polystyrene/ionomer and polymethyl pentene/ionomer; semipermeable composites include oriented polypropylene/ionomer and impermeable composites include unplasticised polyvinyl chloride/ionomer. In cases where increased puncture resistance is required a board/ionomer composite may additionally comprise a layer of polymethyl pentene to give a board/polymethylpentene/ionomer composite. The composite may be pigmented white to give an attractive background for display purposes. Oriented polystyrene/ionomer and polymethyl pentene/ionomer are the preferred lidding materials if 'all round' oxygen permeability is to be maintained.

The present method has significant advantages over the controlled atmosphere method described above. It is of lower cost as the impermeable barrier multi-layer films have been replaced by simpler structures. Also, the method avoids the necessity for producing a special atmosphere which is costly to produce and control and which moreover creates a 'greenhouse' effect when the pack is on display. Incident light causes temperature in the pack to rise as heat generated by the light cannot be dissipated so easily by conduction. A vacuum packed product is much more compact for transportation and storage. The stretch/cling appearance is attractive and leaking packages are readily apparent and in any case are of limited concern because of the skin pack contour holding property. Due to the absence of an unusual atmosphere, there is only the normal spoilage flora to be found after an extended storage period.

A further potential feature of the present packaging process is its extension to products which cause package failure by puncture of the overwrap web. In particular bone, in products such as chops and offals with sharp cartilages, may cause failure of the ionomer films, especially when a hard vacuum is present. These films can draw down around sharp points and such drawing may continue until pressure on the point causes physical failure on the thinned membrane. This failure can be prevented by combining the ionomer with a substantially non-extensible film or ply which limits the progressive thinning of the ionomer. Such a combination can be produced by conventional methods of co-extruding the ionomer with a suitable polymeric material. Clearly a ply of sufficiently high oxygen permeability must be used. The preferred material is a non-extensible grade of polymethyl pentene which allows the ply to have a thickness of up to 300 microns, preferably 100 to 200 microns, whilst still maintaining an adequate gas permeability in the composite. An alternative approach is the use of two or more layers of ionomer with a reinforcing mesh of rigid flexible or extensible plastic net (e.g., "Netlon"). Such a multiply structure gives better puncture resistance and the mesh limits to some extent the progressive extension and thinning of the ionomer.

However, it is possible to use two plies of polymethyl pentene provided that an adequate seal can be effected between them as by high temperature heat sealing or a lacquer coating to improve the heat-seal.

In order to enable the invention to be more readily understood, an example thereof will now be described in greater detail.

In this example, packages of fresh meat, such as beef steak, roasting joints, mince or offal are to be formed on a conventional vacuum packaging - gas flush machine such as a "Multivac R7000" machine of the type described in U.S. Pat. No. 3,956,867 to Kastulus Utz et al., the disclosure of which is incorporated herein by reference. A web of ionomer having a thickness in the range 25 micron to 250 micron to suit the forming depth required is fed into the machine. The web may be heated to 60° C.–70° C. before passing to either a vacuum-forming station or to a pressure-forming station where it is formed into a shrinkable retractile receptacle with a suitable thickness to give the permeability required. The meat produced to be packaged is placed in the receptacle. The receptacle is then brought into contact with a tensioned substantially inextensible composite web. The two webs are combined in a vacuum chamber so that the mouth of the receptacle is covered by this composite which can be of ionomer/paper board (opaque structure) or ionomer/polymethyl pentene (transparent). The ionomer layer should be 20 to 25 microns thickness ideally to permit adequate oxygen transmission therethrough. In opaque structures the ionomer may be pigmented white to give a suitable display backing surface. The package is then evacuated in the chamber structure and a hard vacuum drawn down to an oxygen partial pressure of below 0.9 mm.Hg.. The vacuum is broken by the feeding in of oxygen or an oxygen-rich gas mixture (80% $O_2$+20% $CO_2$ say) to alter the pressure in the package to about 80% of the atmospheric pressure or an oxygen partial pressure of about 600 mm.Hg., after peripheral sealing has been effected. The package may be subjected to a heating stage integral with heat-sealing to effect secondary sealing and shrinkage on the machine. This gives particularly effective retention of drip and exuded juices by sealing the two film webs together. Alternatively the shrink/secondary seal can be effected by hot water at 70° C. to 80° C. The package is then ready for sale with the substantially more rigid composite covering film acting as a base on which the package may rest.

THE DRAWINGS

The above example is illustrated in the accompanying drawings.

In the drawings:

FIG. 1 diagrammatically illustrates the packaging of fresh meat, and

Figure 2:
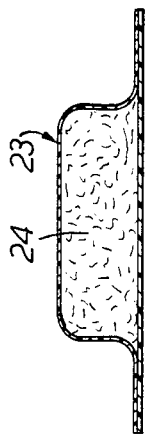

FIG. 2 is a perspective view of a finished package.

In FIG. 1 a web 1 of ionomer is unwound from a feed roll 2 and fed by side grippers (not shown) through the process which is carried out on a "Multivac R 7000" machine modified in a manner to be described. The web is passed into a forming box 3 fitted with a heater 4 an inlet 5 for compressed air and/or a vacuum outlet 6. The web is formed into receptacles 7 in the forming box. After leaving the forming box, the receptacles are filled in turn with the meat product 8 to be packed at a loading station 9. A lidding material in the form of an inextensible composite web 10 is unwound from a feed roll 11 located above the flow path of the receptacles 7 and brought to cover the receptacles. The two webs are then combined in a vacuum chamber 12, so that the mouth of the receptacle is covered by and heat sealed to the composite web, using a heated sealing plate 13. The vacuum chamber of the "Multivac R 7000" machine is connected by three connections 14, 15 and 16 to a valve mechanism 17 which in turn is connected to a source of vacuum 18, a source of oxygen or oxygen-rich gas 19 and the ambient atmosphere 20. The connection 14 leads from the valve mechanism through the sealing plate 13 to the space above the composite web 10, the connection 15 leads to the space between the webs 1 and 10 and the connection 16 leads to the space below the web 1. The valve mechanism 17 is arranged so that as the receptacle 7 and its cover are brought into the vacuum chamber 12, the connections 14, 15 and 16 are placed in communication with the source of vacuum 18 so that a hard vacuum is applied to the space above the web 10 to the space below the receptacle and to the space between the webs. The application of the vacuum to above and below the webs prevents them from flapping around in the machine and enables the vacuum to be applied more effectively to the meat product itself to reduce the oxygen partial pressure in the vicinity of the meat to below 0.9 mm. of mercury. When this partial pressure has been reached, the valve mechanism places the connection 15 in communication with the oxygen source 19 so that oxygen or oxygen-rich gas is fed to the space between the webs to an oxygen partial pressure of say 600 mm. of mercury, whereupon the heated sealing plate 13 is operated to seal the composite web 10 to the receptacle 7. The connections 14, 15 and 16 are then placed in communication with the ambient atmosphere 20 so that the vacuum packaging operation can recommence. The lower part of the vacuum chamber 12 is movable up and down relative to the upper part to permit travel of the receptacles through the chamber and has a steam inlet 21 whereby steam may be admitted to the chamber to effect heat shrinkage of the ionomer film. The receptacles leaving the vacuum chamber are separated by a knife 22 into individual packages 23 which may then be subjected to edge trimming and in which the meat product 8 is held in an atmosphere at a pressure below atmospheric and an oxygen partial pressure of about 600 mm. of mercury.

FIG. 2 shows a finished package 23 containing a piece of steak 24.

Instead of using a single web of ionomer as one of the materials of which the package may be formed, it is possible to use a composite formed of co-extruded plies of an extensible grade of polymethyl pentene and ionomer, and such a composite material can be used as either or both of said first and second materials or webs.

This composite material may consist of a web of polymethyl pentene having a thickness of 25 to 900 microns laminated to a web of ionomer having a thickness of 15 to 250 microns, and the two webs may be laminated together by a process of co-extrusion, adhesive-bonding or extrusion-lamination. The material may be hot- or cold-drawn to form a receptacle in which the fresh meat may be placed to be covered by a lid of the same material. The gas transmission rate of the ionomer component of the composite material is suitable for the requirements of the package of fresh meat and, for oxygen, would be at least 3,000 and preferably at least 5,000 ml/m$^2$/24 hours/atmosphere differential.

The use of polymethyl pentene as a component of the material enables the material to be considerably thicker, and thus stronger and more puncture-resistant than when the material is an ionomer monofilm, because polymethyl pentene is sixteen times more permeable to oxygen than ionomer. Thus it is possible to make the receptacle of the package mechanically stronger and more resistant to puncture by bone.

In the use of such composite material in packaging equipment, the minimum thickness of the ionomer layer is determined by the necessity for obtaining adequate heat-sealing of the material at the periphery of the receptacle and this minimum thickness is about 15 microns. However, the formation of the receptacle causes the ionomer layer to be thinned pro-rata by the drawing of the receptacle so that a thin highly resilient membrane of ionomer of very high gas transmission rate can be produced in the body of the receptacle while still maintaining the required minimum thickness of 15 microns required for adequate heat-sealing at the periphery. For example, if the formation of the receptacle results in a threefold increase of area of the drawn region, the resulting 5 micron layer of ionomer has a gas transmission rate of 25,000 ml/m$^2$/24 hours/atmosphere differentials.

The tough, resilient nature of the composite material and the fact that it can be of greater thickness than an ionomer monofilm facilitates the use of the material on packaging machines which employ gripper fingers or chains to hold and transport the receptacles both unfilled and when subsequently filled with fresh meat.

Although it is possible to make the receptacle and the lidding material of the ionomer/polymethyl pentene composite material, it is preferred to make the lidding material either of a board/polymethyl pentene/ionomer triple composite or one of the other stiffer composite lidding materials referred to above, especially where the lidding material is to be pigmented to give an attractive background for display purposes.

The use of the ionomer/polymethyl pentene composite is particularly useful in the case where the fresh meat is packaged as a vacuum-packed anaerobic package, and the pressure is cut back with nitrogen instead of oxygen.

The invention will now be further illustrated by the following Examples:

EXAMPLE 1

A composite material comprising a layer of an extensible grade of polymethyl pentene 50 microns thick laminated by co-extrusion in conventional manner to an ionomer layer 25 microns thick is formed by drawing into a receptacle with a wall thickness at its edge of 25 microns where heat-sealing to a lidding material is to occur. This results in an ionomer thickness of 8 microns at the base of the receptacle with a gas transmission rate of 15,000 ml/m$^2$/24 hours/atmosphere. After filling with fresh meat, the receptacle is heat-sealed with a board/ionomer lidding material in the manner described above with reference to the drawings.

EXAMPLE 2

A composite material comprising a layer of an extensible grade of polymethyl pentene 300 microns thick laminated to an ionomer layer 25 microns thick is formed by drawing into a receptacle with a wall thickness at its base of 65 microns and a gas transmission rate of 25,000 ml/m$^2$/24 hours/atmosphere. After filling with fresh meat the receptacle is heat-sealed with a board/polymethyl pentene/ionomer composite in the manner described above with reference to the drawings to give a package with a high degree of puncture and penetration resistance.

The packages produced by Examples 1 and 2 both contain the fresh meat in an oxygen-rich atmosphere at subatmospheric oxygen partial pressure of 600 mm. of mercury. As the oxygen is used up by the formation of oxymyoglobin, fresh oxygen will permeate into the package through the wall of the package, while the outflow of resulting carbon dioxide will maintain the sub-atmospheric pressure and thus the close fitting nature of the material to the meat and the neat appearance of the package.

EXAMPLE 3

The procedure of Example 2 was repeated but instead of controlling the partial release of the vacuum with oxygen supplied through the inlet 14, the partial release of the vacuum was effected with nitrogen and the packages were sealed and shrunk as described to give a package in which the atmospere in the vicinity of the meat was a nitrogen atmosphere at a pressure of 600 mm. of mercury. The resulting anaerobic packages were immediately passed to storage in a master pack container under a nitrogen atmosphere.

When a package was removed from the master pack container, oxygen readily permeated through the wall of the package due to the sub-atmospheric pressure in the vicinity of the meat and produced ready "blooming" of the meat.

In addition to board base (or other composite structures resembling paper board) an alternative presentation is possible in which a packaging adjunct (e.g. foamed polystyrene board or tray, foil-board structure or other presentation surface structure) can be incorporated within the package (placed on top of the meat in the receptacle) to give a rigid base to the package when this is inverted at the point of sale. A wide range of shapes and sizes of meat cut can be accommodated on the machine, within the size limits of the cavities in the forming/sealing dies since the surplus film is drawn out of the way on the vacuuming/sealing station and subsequently shrinks away. In the case of chops and bone-in meat products likely to cause puncture, the base-forming web can be made of a co-extruded composite of ionomer and a non-extensible grade of polymethyl pentene to give the puncture resistance needed in such case.

Unlike in the case of non-shrink laminates, the forming die shape and contour are not highly significant. With conventional non-shrink laminates these have to be accurately tailored to give snug-fitting packages free from wrinkles and excess film material. When the meat is correctly handled (in respect to temperatute specifically) in the abattoir, chilling, preparation and cutting stages and then held at 31.5° Fahrenheit ($-0.25°$ C.) substantial shelf life approaching that of controlled atmosphere packaged products can be obtained.

The pack is also capable of a dual role and use as a frozen meat package. In this case the meat will generally be packed fresh and the resulting pack may be frozen for storage. In its use as a frozen meat package, significantly, no freezer burn will occur due to the skin packaging effect.

The present pack is also of value in cases where the animal from which the meat is obtained has been treated, The present pack is also of value in cases where the animal from which the meat is obtained has been treated, before slaughter, with a tenderiser, such as a papain-type tenderiser. In cases where no such treatment has occurred, the meat is normally vacuum-packed and tenderising of the meat occurs over a three week period in the vacuum pack. However, by packing tenderiser-treated meat in the pack of the present invention, tender-eating meat can be made available earlier than the three week period required for non-treated meat.

What we claim is:

1. A method of packaging fresh meat, comprising the steps of forming a first web of material into a receptacle to receive fresh meat, placing the fresh meat in said receptacle, subjecting said meat to a vacuum treatment to remove the permanent gases therefrom and to reduce the oxygen partial pressure in the vicinity of said meat to below 0.9 mm of mercury, effecting controlled partial release of said vacuum to an oxygen partial pressure in excess of about 11 mm of mercury, said release effected at a rate sufficiently rapid to prevent substantially any detriment to said meat, contacting the mouth of the receptacle with a second web of material, sealing said second web to said first under the latter pressure to form a closed package containing said fresh meat and heating the resulting package to shrink one of said webs into close contact with said fresh meat; at least one of said webs being transparent and at least one of said webs being heat-shrinkable and having a permeability to oxygen of at least 3000 ml/m$^2$/24 hours/atmosphere differential for a thickness of 25 microns at N.T.P., and a permeability to carbon dioxide substantially greater than its permeability to oxygen.

2. The method of claim 1, wherein one of said webs is both transparent and permeable to oxygen.

3. The method of claim 1, wherein one of said webs is flexible and the other is more rigid.

4. The method of claim 3, wherein the more rigid web is pigmented.

5. The method of claim 3, wherein the more rigid web is an oxygen permeable composite web comprising an ionomeric polymer combined with an oxygen-permeable material selected fropm the group consisting of board, oriented polystyrene, polymethyl pentene, unplasticised polyvinyl chloride and oriented polypropylene.

6. The method of claim 1, wherein one of said webs comprises an oxygen-permeable ionomeric polymer selected from the group consisting of the sodium and zinc salts of ethylene-acrylic acid and ethylenemethacrylic acid copolymers.

7. The method of claim 6, wherein the web of ionomeric polymer is combined with a substantially non-extensible film or ply.

8. The method of claim 7, wherein the web of ionomeric polymer is combined with an oxygen-permeable layer of a substantially non-extensible grade of polymethyl pentene.

9. The method of claim 6, wherein the web of ionomeric polymer is combined with an oxygen permeable layer of an extensible grade of polymethyl pentene.

10. The method of claim 9, wherein the web of ionomeric polymer has a thickness of 25 to 250 microns and the layer of polymethyl pentene has a thickness of 25 to 900 microns.

11. The method of claim 1, wherein controlled partial release of the vacuum is effected with an oxygen-rich gas to an oxygen partial pressure in the vicinity of said meat of about 600 mm. of mercury.

12. The method of claim 11, wherein controlled partial release of the vacuum is effected with a gas mixture comprising 80% oxygen and 20% carbon dioxide.

13. The method of claim 1, wherein the heat-shrinkable web has a permeability to oxygen of at least 5000 ml/m$^2$/24 hours/atmosphere differential for a thickness of 25 microns at N.T.P.

* * * * *